United States Patent Office 3,421,597
Patented Jan. 14, 1969

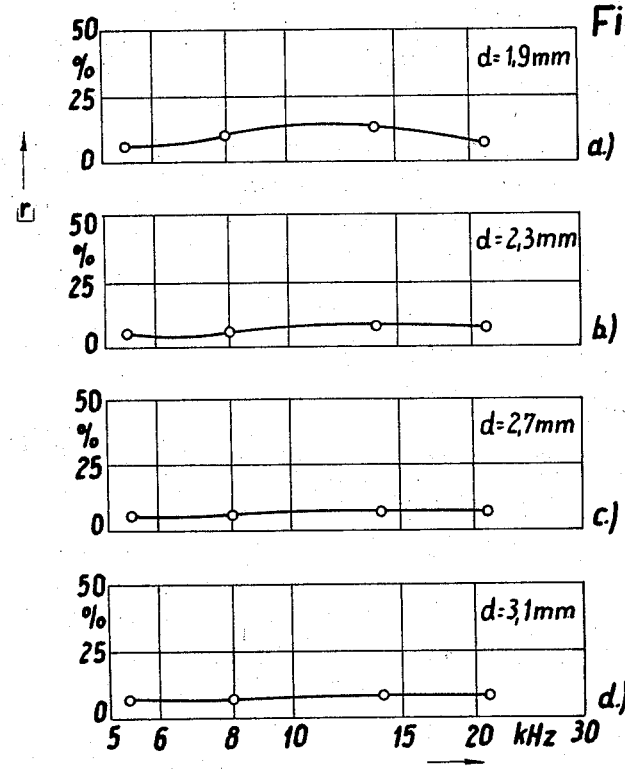
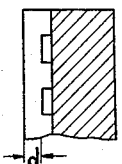
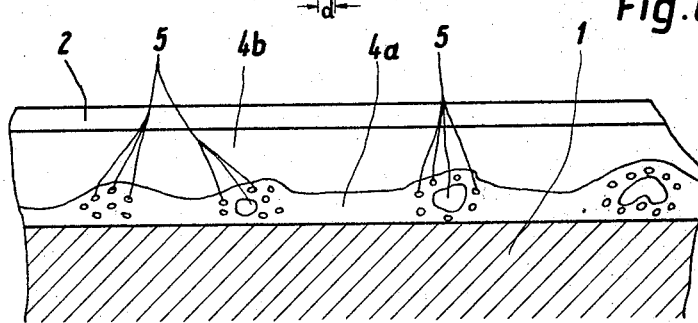

3,421,597
SOUND ABSORBER
Hans Blau, Baden-Baden, and Gerhard Stoof, Hilden, Germany, assignors to Hermann Wiederhold, Hilden, Rhineland, Germany
Filed Sept. 20, 1965, Ser. No. 493,303
Claims priority, application Germany, Sept. 21, 1964, M 62,506
U.S. Cl. 181—33        13 Claims
Int. Cl. E04b 1/99

ABSTRACT OF THE DISCLOSURE

A broad band low reflection sound absorber for absorbing sound through a solid or liquid medium and adapted to transform the sound particle velocity of sound incident upon the same, which sound absorber comprises as the essential sound absorbing element a body of dissipative synthetic material which is constituted by an incompletely cross-linked or incompletely cross-linked and plasticized polyurethane elastomer having compressible occlusions incorporated therein.

---

The present invention relates to a sound absorber and, more particularly, to a broad band sound absorber of low reflectivity for sound waves transmitted through solid and liquid media, and to a method for producing such sound absorber.

The term "broad band sound absorber" is intended to denote that the sound absorber is capable of absorbing sound waves for a wide range of frequencies.

The sound absorber according to the present invention is capable to transform sound particle velocity and includes a body or layer of synthetic material formed of two or more components, which synthetic material is incompletely cross-linked and/or is softened, and which body or layer of synthetic material is formed with compressible occlusions incorporated therein.

It is an object of the present invention to provide a sound absorber which permits transfer of sound energy from a contacting liquid or solid medium to the sound absorber with very little sound reflection and with irreversible conversion of the sound energy received by the sound absorber into another form of energy.

Other objects and advantages of the present invention will become apparent from a further reading of the description and of the appended claims.

With the above and other objects in view, the present invention includes a broad band sound absorber for absorbing sound transmitted through solid and liquid media, the sound absorber being adapted to transform the sound particle velocity of sound contacting the same, the sound absorber including a sound absorbing body consisting essentially of a dissipative synthetic material selected from the group consisting of incompletely cross-linked synthetic materials, softened synthetic materials, and incompletely cross-linked and softened synthetic materials, and compressible occlusions incorporated in the body of synthetic material.

The present invention also contemplates a method of producing a broad band sound absorber for absorbing sound transmitted through solid and liquid media, comprising the steps of introducing into a layer-shaped mold a bubble-free mixture of low viscosity components adapted to react with each other under hardening and formation of a dissipative, solid, incompletely cross-linked synthetic material, the mixture having distributed therethrough discrete particles of compressible material, and hardening the mixture in the mold so as to form a layer consisting essentially of incompletely cross-linked material having compressible occlusions incorporated therein, the layer having sound absorbing properties.

According to one embodiment of the method of producing a broad band sound absorber for absorbing sound transmitted through solid and liquid media, the method comprises the steps of adhesively adhering to a face of a support spaced particles of resilient close-cell cellular material, covering the face and the particles with a bubble-free mixture of low viscosity components adapted to react with each other under hardening and formation of a dissipative, solid, incompletely cross-linked synthetic material, and hardening the mixture, thereby forming on the support a sound absorbing layer.

It is possible to produce arrangements utilizing acoustically dissipative materials which, to a very large extent, absorb sound waves transmitted to such dissipative material through a contacting liquid or solid body.

Such absorber devices should comply as far as possible with two essential requirements, namely, the transfer of the sound energy into the absorber device with as little sound reflection as possible, and irreversible conversion of the sound energy into another form of energy within the absorber material. In order to achieve the desired result with absorber layers of minimum thickness, it is essential to achieve a high degree of energy loss within the absorber material. This high degree of loss is obtained according to the present invention by utilizing as the absorber layer a synthetic material formed of two or more components which is incompletely cross-linked and/or softened. It has been found that thereby, the main dispersion range of the modulus of elasticity of the respective synthetic material can be shifted within the generally prevailing temperature ranges. This means simultaneously that a maximum of mechanical energy losses can be obtained within such temperature ranges.

The thin, broad band sound absorber of low reflectivity consists essentially, in accordance with the present invention, of a softened and/or incompletely cross-linked highly dissipative synthetic material with compressible occlusions incorporated therein.

According to one embodiment of the present invention, the compressible occlusions consist of closed cell, cellular particles of foam rubber or resilient synthetic foam material, and the strongly dissipative synthetic material forms a layer or body which is free of gas bubbles.

Thus, according to the present invention, a two or multi-component casting mass or mixture which will react under hardening and incomplete cross-linking is hardened to form the sound absorbing body or layer. This casting mass, after hardening, must not contain any gas bubbles, except gas which may be contained in the resilient compressible occlusions, which are incorporated into the mixture and will remain incorporated in the hardened layer or the like. Uncontrolled gas bubbles would tend to change the resiliency and thus the sound absorbing qualities of the casting mass. It has been found, according to the present invention, that the above mentioned conditions are met in a particularly complete and advantageous manner by using as the occlusion-containing sound absorbing material a polyurethane casting mass.

The desired degree of incomplete cross-linking can be achieved in a very simple manner by forming a non-stoichiometric mixture of the preferably highly liquid components which react under formation of a polyurethane. For instance, the isocyanate component which serves as hardener in the formation of the polyurethane may be present in less than the amount required for complete cross-linking. It is achieved thereby that the casting mass remains incompletely cross-linked even after completion of the hardening. In other words, a portion of the molecular bonds which would be formed upon complete cross-linking will not be formed when, for instance, the isocyanate is present in less than the stoichiometrically required amount. In such incompletely cross-linked materials, upon applying mechanical stress to the material, additional relaxation mechanisms come into play which cause a considerable increase in the mechanical energy losses.

The requirement that the hardened polyurethane elastomer is to be free of gas bubbles is achieved by utilizing liquid starting materials of relatively low viscosity, such as between about 100 and 300 cp., and a relatively long pot life of the mixture, such as about 30 minutes. Any air bubbles carried along during casting of such layer will be capable of escaping upwardly under the above described conditions before the viscosity of the mixture raises to such an extent as to prevent such upward movement of the air bubbles.

As discussed above, a sound absorber in the form of a thin layer requires a resilient material such as rubber or a synthetic material which has the highest possible inner losses, i.e., a material in which mechanical working of the same such as bending, tensioning, stretching or shearing will cause conversion of the largest possible part of the deformation energy into heat. In order to achieve such dissipative deformations of the material, it is required to incorporate therein discrete compressible occlusions. Such occlusions will make it possible for the absorption material such as the polyurethane elastomer, under the impact of the sound pressure to reversibly yield or evade the sound waves at certain points. By this manner of deformation of the material caused by the presence of the compressible occlusions, considerable shearing losses will occur. If the elastomer were exposed only to the pure compression caused by the sound waves without the modification due to resilient occlusions, a relatively small loss of energy would be experienced. The number and size of the compressible occlusions thus exerts a great influence on the effectiveness of the sound absorbing layer.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 3:
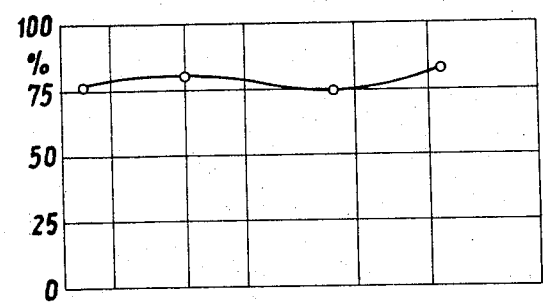
Figure 3:
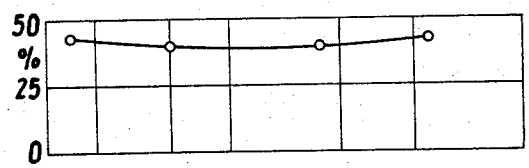
Figure 3:
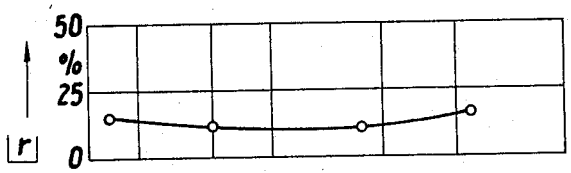
Figure 3:
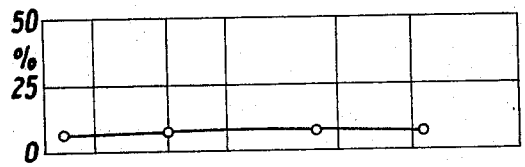
Figure 3:
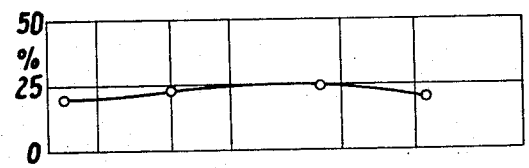
Figure 3:
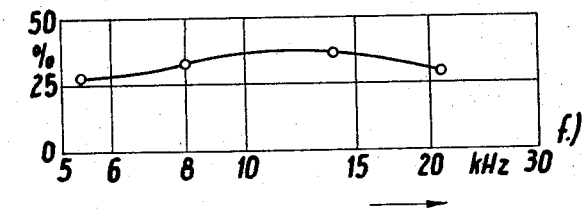

FIGS. 3a–f illustrates for six different sets of conditions the amplitude reflection factor as a function of the frequency, utilizing as parameter the number of resilient occlusions;

FIGS. 4a–d diagrammatically illustrates for four different sets of conditions the amount of the amplitude reflection factor as a function of the frequency utilizing the thickness of the layer as parameter;

FIG. 5 is a schematic elevational view serving for further illustration of layer thickness $d$ of FIGS. 3 and 4; and FIG. 6 is a schematic cross-sectional representation of an embodiment of a sound absorbing layer according to the present invention.

Figure 1:
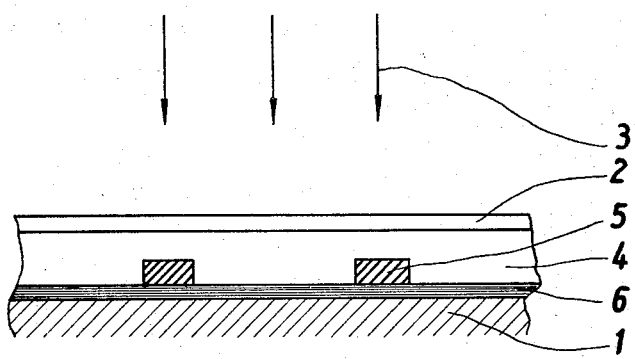
FIG. 1 is a somewhat schematic cross-sectional view of a sound absorber according to the present invention which is to be produced by pouring of the sound absorbing layer onto the wall which is to be covered by the same.
Figure 2:
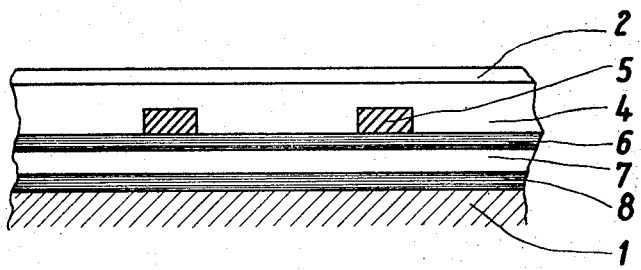
FIG. 2 is a schematic cross-sectional view of a sound absorber according to the present invention which has been applied to a foil and which foil, in turn, has been adhesively adhered to the wall which is to be covered.

Referring now to the drawings, and particularly to FIGS. 1 and 2, a wall 1 is shown which is to be covered with a sound absorbing layer and which may consist, for instance, of a steel plate of 12 mm. thickness. First, a firmly adhering adhesive layer 6 is brushed or sprayed onto the exposed face of wall 1. The purpose of adhesive layer 6 is to hold the compressible occlusions 5 in the desired distribution on the face of wall 1 during the application of the polyurethane elastomer 4 and, furthermore, to assure very good adherence of the polyurethane layer on wall 1.

The adhesive, for instance, may be a natural rubber adhesive. It is important in choosing the adhesive and in applying the same that adhesive layer 6 will be free of gas bubbles. If the surface of wall 1 to which the sound absorbing layer is to be adhered is very smooth, it is advantageous to roughen the surface of wall 1 prior to application of adhesive 6, for instance, by sand blasting.

The compressible occlusions 5 may be closed cell foam rubber particles in the shape of flat cylinders having a height of between 2 and 3 mm. and a diameter of 9 mm. It would also be possible in accordance with the presently discussed embodiment to use as resilient compressible occlusions strips of resilient closed cell foam rubber having a height of 3 mm., a width of 5 mm. and a length of 15 mm. The compressibility of the foam rubber preferably will be equal about $10^{-7}$ cm.$^2$/dyn. The number of compressible occlusions should then be equal to between 0.25 and 0.5 per square centimeter of wall surface.

The schematic representations of FIGS. 3a–3f refer to the above described material, and an elastomer layer having a weight of 10 g./cm.$^2$, a degree of cross-linking of 10:3.0, a layer thickness of 5.0 mm., and as occlusions closed cell resilient foam rubber strips of 13×5 mm.$^2$ and a height of 3 mm.

According to FIG. 3a no occlusions are present. The amplitude reflection factor as a function of frequency, on the average, will be found to be 75% or more.

Upon incorporation of two strips according to FIG. 3b, the amplitude reflection factor will drop under otherwise equal conditions, to below 50%. Upon incorporation of four strips, in accordance with FIG. 3c, the amplitude reflection factor will drop considerably below 25%. If, in accordance with FIG. 3d, six strips of the described dimensions are incorporated, the reflection factor will drop further, namely to about 10% and will remain even over a large frequency area.

As shown in FIG. 3e, upon incorporation of eight strips of foam rubber as occlusions under otherwise similar conditions, the reflection factor will rise up to about 25%, and, as shown in FIG. 3f, in the case of ten strips, the reflection factor rises again to above 25%.

A further increase in the number of resilient occlusions will cause a further rise of the amplitude reflection factor.

The compressible occlusions may be arranged in regular patterns or in a statistical manner.

After compressing the foam rubber particles 5 onto adhesive layer 6, the polyurethane casting mass 4 is poured on, which mass contains a desired proportion of the polyol component relative to the isocyanate component to obtain the desired degree of incomplete cross-linking.

In the presently described case, a polyurethane casting mass of the following composition was used:

*Polyol component*

22.3 parts by weight of a polyether produced by reaction of propylene oxide and trimethylol propane with a hydroxyl content of 11.5%
66.25 parts by weight castor oil
11.45 parts by weight sodium aluminum silicate

*Isocyanate component*

30 parts by weight technical diphenylmethane-4,4'-diisocyanate

In order to obtain a layer free of gas bubbles, the two above described components of the polyurethane elastomer are degassed under vacuum prior to mixing.

This mixture is incompletely cross-linked to an extent of about 40%.

In order to improve the water resistance of the hardened polyurethane elastomer, a small amount of "Stabaxol" is added to the polyol component.

The thickness of the elastomer layer preferably is such that the same exceeds the thickness of the occlusions 5 by between 2.3 and 3 mm.

FIGS. 4a–d illustrate the amplitude reflection factor as a function of the frequency with the thickness of the layer 5 as parameter. These values were determined on the same material as used and described in connection with FIG. 3. The weight of the layer again equaled 10 g./cm.$^2$. The degree of cross-linking of 10:3.5 again corresponds to that according to the conditions described in FIG. 3.

The results obtained according to FIG. 4 were determined with four different thicknesses of the elastomer layer over occlusions, namely seven strips of 13 x 5 x 3 mm. The curves according to FIG. 4 thus can be compared with a curve which would be somewhere between the curves of FIGS. 3d and 3e. The thickness of the respective layers above the strip occlusions is indicated as $d$ in the respective FIGS. 4a–d.

FIG. 5 further illustrates what is to be understood in FIGS. 4a–d as the thickness of the layer $d$ above the occlusions. This thickness is indicated by $d$ in FIG. 5.

FIG. 4a shows that at a layer thickness, as defined above, $d$ equals 1.9 mm., the amplitude reflection factor as function of the frequency is considerably below 25%. At a layer thickness of 2.3 mm. according to FIG. 4b, this factor drops further, and a further drop is found at the layer thickness of 2.7 mm. (FIG. 4c). At a layer thickness of 3.1 mm., a very small reflection factor which is substantially equal over a wide range of frequencies is found, as shown in FIG. 4d.

It follows that maintenance of a given thickness of the layer and any roughness of the free surface of the elastomer layer are of little significance, and this is particularly important for producing a sound absorbing layer by spraying methods. Considering the thickness of the resiliently compressible occlusions, the total thickness of the absorbing layer, in accordance with the values discussed above, will be about 5 mm.

After hardening for about 24 hours, the sound absorbing layer is covered with a layer 2 which protects the sound absorbing layer against medium 3 through which the sound waves pass toward the sound absorbing layer. Protective layer 2 may be a liquid resistant layer or another liquid resisting coating which will protect against erosion. In the case that the sound absorbing layer must be protected against being habitated by vegetable or animal sea organisms, protective layer 2 should be covered by an anti-fouling paint. Such anti-fouling paint should be of sufficient resiliency and should prevent the growth of organisms on the sound absorbing device for at least 18 minutes. As anti-fouling paint which contained an organo-metallic compound as the toxic constituent gave good adherence to and resiliency on the sound absorbing layer.

When it is not possible to apply the polyurethane mass by direct pouring or spraying onto the support or object which is to be protected, for instance in the case of the vertical walls of a submarine measuring vessel, it may be advantageous to apply the sound absorbing layer in a manner akin to paper hanging.

A foil 7 (note FIG. 2) is inserted into a suitable mold and an adhesive layer 6 is applied thereto. Thereafter, the compressible resilient occlusions 5 are sprinkled onto adhesive layer 6 and then the mixture which will form the polyurethane elastomer 4 is poured into the mold. After hardening, the absorption layer is covered with protective layer 2. The thus formed composite sound absorbing layer can be removed from the mold and applied to a supporting surface by means of a suitable adhesive 8.

In the frequency range of between 4 and 20 kHz., the above described sound absorbing layer has an amplitude reflection factor of less than 10%, i.e., less than 1% of the contacting sound energy will be reflected. Thereby, the total thickness of the sound absorbing layer of about 5 mm. equals only about ⅟₃₀ of the sound wave length in water at 10 kHz. (FIGS. 3 and 4). These very small reflection values were determined with the above described absorbing layer in a temperature range between 18 and 24° C.

The dimensions and the number of compressible occlusions were described above with respect to a sound absorbing layer having a weight of about 10 g./cm.$^2$. A reduction of the dimensions of the supporting wall, for instance lesser thickness of the plates and/or lesser density, must be compensated by suitable increase in the resiliency of the absorbing layer, for instance by providing an absorbing layer of somewhat greater thickness or an additional number of small compressible resilient occlusions.

An increase in the weight of the material to which the sound absorbing layer is applied will cause less change in the sound absorbing properties than a reduction in the unit weight of wall 1. When it is desired to increase the thickness of the absorbing layer then, in order to obtain the same result, the resiliency of the same, i.e., the number of compressible occlusions must be reduced.

The above described sound absorbing layer showed a high degree of stability against starting pressures up to 5 atmospheres gauge pressure even for prolonged periods of time. The application of even higher starting pressures would require a reduction in the compressibility of the closed cell foam rubber or the like occlusions and this would also require a change in the number and dimensions of the occlusions.

The sound absorber according to the present invention is highly water resistant. By exposure, without protective layer 2, for six months to artificial sea water, the weight of the thus exposed samples of the sound absorbing layer increased on the average only by 1.9%. A change of the resiliency values was observed only within the first few days of immersion in water but not thereafter. Temperatures between zero and +80° C. did not cause any irreversible changes in the polyurethane elastomer.

Submersion of the cast polyurethane body for several months in diesel oil proved that the mass is oil resistant.

While the sound absorbers described up to now utilize only compressible occlusions consisting of closed cell resilient foam rubber or foamed synthetic materials, it would also be possible according to the present invention to provide a sound absorber or sound absorbing layer in which the foam rubber or the like occlusions are replaced by gas bubbles. These gas bubbles, similar to the above described compressible occlusions would have to be introduced or produced in a defined amount in the polyurethane elastomer. For this purpose generally undesirable side reactions of the isocyanate may be used, namely the splitting-off of carbon dioxide in the presence of water.

As illustrated in FIG. 6, it is important in this case that the gas bubbles are located either in the sound absorbing layer but close to the face thereof which is opposite to the face which is exposed to the sound waves, or in an additional layer of synthetic material which is interposed between the polyurethane layer and the support, such as wall 1. It is necessary that the gas bubbles are spaced from the vicinity of the face of the polyurethane layer which is exposed to the sound waves in order to achieve a sufficient degree of deformation of the polyurethane elastomer. If the gas bubbles would be arranged in the immediate vicinity of the face of the polyurethane layer which is exposed to the sound waves, then the pressure of the contacting sound wave would break down at such gas bubbles arranged closely to the surface contacted by the sound waves and this would lead to a high degree of reflection of the latter.

Referring again to FIG. 6, it will be seen that wall 1 which is to be protected is covered by a layer of synthetic material 4a containing compressible occlusions 5. Layer 4a may be a polyurethane elastomer in which gas bubbles were formed by retaining traces of moisture in the mixture of polyurethane-forming components. Synthetic layer 4a with the compressible occlusions therein is then covered at its free face with a further layer of synthetic material 4b which forms the sound absorbing layer and consists, according to the present invention, of a two or multi-component synthetic material formed of a non-stoichiometric mixture of the components so that the synthetic material will be only incompletely cross-linked. A further protective layer 2 is applied to the free face of layer 4b and serves as protection against corrosion, erosion and plant or animal growth.

It will be understood that each of the elements described above, or two or more together, may also find a useful application in other types of sound absorbers differing from the type described above.

While the invention has been illustrated and described as embodied in a composite sound absorbing layer adapted to absorb sound waves transmitted through a liquid or solid medium, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. A broad band low reflection sound absorber for absorbing sound transmitted through a solid or liquid medium, said sound absorber being adapted to transform the sound particle velocity of sound incident upon the same, wherein said sound absorber comprises a body of dissipative synthetic material which is constituted by an incompletely cross-linked polyurethane elastomer or a both incompletely cross-linked and plasticized polyurethane elastomer, said elastomer being essentially free of gas bubbles; and compressible solid occlusions consisting essentially of closed-cell foam rubber or closed-cell, resilient, synthetic foam material incorporated in said body of synthetic material.

2. A sound absorber according to claim 1, wherein said polyurethane elastomer comprises a polyether and/or castor oil in combination with an isocyanate.

3. A sound absorber according to claim 2, wherein said polyurethane elastomer is formed of (a) a polyol component consisting of 22.3 parts by weight of a polyether formed of propylene oxide and trimethylol propane and containing 11.5% hydroxyl groups, 62.25 parts by weight of castor oil and 11.45 parts by weight of sodium-aluminum silicate, and (b) an isocyanate component of 30 parts by weight diphenylmethane-4,4'-diisocyanate.

4. A sound absorber according to claim 2, wherein said dissipative material includes a catalyst adapted to reduce the pot life of said polyurethane elastomer.

5. A sound absorber according to claim 1 and wherein the body of dissipative material is in the form of a layer having a face adapted to be exposed to sound waves, comprising a protective layer superposed upon and firmly adhered to said face.

6. A sound absorber according to claim 5, wherein said protective layer consists essentially of a stoichiometrically cross-linked, plasticized synthetic material.

7. A sound absorber according to claim 1 and wherein the body of dissipative material is in the form of a layer having a face adapted to be exposed to sound waves, comprising a layer of adhesive material adhered to the opposite face of the layer of dissipative material.

8. A sound absorber according to claim 1 and wherein the body of dissipative material is in the form of a layer having a face adapted to be exposed to sound waves, comprising a foil adjacent to the opposite face of said layer, and an adhesive interposed between said foil and said layer adhering the same to each other.

9. A sound absorber according to claim 2, wherein said polyurethane elastomer is cross-linked to an extent of from 40% to 90%.

10. A sound absorber according to claim 2, wherein said polyether and/or castor oil is at least partially replaced by a hydroxyl group-containing polyester.

11. A sound absorber according to claim 2, wherein said polyether and/or castor oil is partially replaced by a plasticizer.

12. A sound absorber according to claim 11, wherein said plasticizer is a chlorinated hydrocarbon.

13. A sound absorber according to claim 11, wherein the polyether and/or castor oil and said plasticizer are at least partially replaced by a tar adapted to react with an isocyanate to form a polyurethane elastomer.

References Cited

UNITED STATES PATENTS

| | | | |
|---|---|---|---|
| 2,184,482 | 12/1939 | Austin et al. | 181—33.1 |
| 2,785,739 | 3/1957 | McGregor et al. | 181—33.11 |
| 2,811,216 | 10/1957 | Harris | 181—33.1 |
| 2,866,730 | 12/1958 | Potchen et al. | 181—33.1 |
| 3,016,575 | 1/1962 | Ebneth | 181—33.11 |
| 3,046,172 | 7/1962 | Reid | 181—33.11 |
| 3,061,491 | 10/1962 | Sherrard et al. | 181—33.1 |
| 3,072,582 | 1/1963 | Frost | 181—33.11 |
| 3,087,568 | 4/1963 | Kurtze | 181—33.1 |
| 3,117,054 | 1/1964 | Antonucci | 181—33.1 |
| 3,160,549 | 12/1964 | Caldwell et al. | 181—33.11 |

ROBERT S. WARD, JR., *Primary Examiner.*